Aug. 5, 1958

A. NELSON 2,845,653

RELEASABLE COUPLINGS

Filed Sept. 29, 1954

INVENTOR
AUSTIN NELSON

Holcombe Wetherill Brisebois
ATTORNEYS

Aug. 5, 1958    A. NELSON    2,845,653
RELEASABLE COUPLINGS

Filed Sept. 29, 1954    2 Sheets-Sheet 2

INVENTOR
AUSTIN NELSON
Holcombe Wetherill & Burebois
ATTORNEYS

United States Patent Office 2,845,653
Patented Aug. 5, 1958

2,845,653

RELEASABLE COUPLINGS

Austin Nelson, Sutton, England, assignor to Archer Works Engineering Company Limited, London, England, a British company Application September 29, 1954, Serial No. 459,189

Claims priority, application Great Britain October 30, 1953

3 Claims. (Cl. 16—172)

This invention relates to releasable couplings.

The object of the invention is to provide a releasable coupling which can be used as a support for a projection, such as a shelf, flap, table, platform, staging or like surface, from a wall or like surface, in such a way as to enable the supported part to be readily removed and/or replaced as required.

With the foregoing object in view a releasable coupling made in accordance with the invention comprises an outer member having a partly cylindrical or like curved edge formed so as to leave a space between the curved edge and the adjacent side of said member, an inner member also having a partly cylindrical or like curved edge formed so as to leave a space between the curved edge and the adjacent side of said member, the curvature of the curved edge of said inner member being of somewhat smaller diameter than the curved edge of said outer member to enable it to fit snugly therein, said inner member being fitted in said outer member by inserting the curved edge thereof in the space of said outer member and turning said inner member in one direction so that the said curved edge seats against the curved edge of said outer member, said inner member being releasable from said outer member by turning said inner member in the opposite direction and withdrawing the curved edge of said inner member through the space of said outer member.

The mechanical strength of a coupling made according to the invention can be readily designed to suit the conditions of use. The two coupling members may be made from thick metal sheet and the coupling may be designed to withstand really heavy loading such for example as would be involved in a coupling for suspending cradles and hoists for workmen. In the case where relatively small mechanical strength is required the two coupling members may be moulded from a suitable plastic. The two coupling members may be made by pressure die casting, a suitable metal being, for example, the aluminium alloy known under the trade name "Mazac," and consisting of an alloy of aluminium, magnesium, zinc and copper. The coupling members may be made in any other suitable way, for example by extrusion or moulding.

The coupling may be used for supporting a shelf, table, flap, platform, staging, or like surface on a wall or like surface, in which case the supporting device may comprise two of the couplings above referred to, the outer members of the couplings being fixed in suitable spaced relationship on the wall or like supporting surface, and the inner members being fixed to the shelf so as to be engageable respectively with the members fixed to the wall.

Means may be provided for limiting lateral movement of the shelf in the supported position. One form of such means consists in closing or facing the outer ends of the two coupling members to be fixed to the wall. Another such means consists in forming the inner ends of the two coupling members to be fixed to the shelf with stops to butt respectively against the inner ends of the coupling members to be fixed to the wall.

The end of each coupling member to be fixed to the shelf or the like may be turned inwards to form a ledge to receive and support the end of the shelf or the like.

The coupling may be used in conjunction with a device for supporting the underneath surface of the shelf, flap, platform, table or like surface to be supported, this device comprising an arm pivotally mounted at one end in a bracket adapted to be fixed to the supporting surface and a plate adapted to be secured to the underneath surface of the shelf or like surface to be supported, the plate being provided with one or more stops, indentations or the like for engagement by the free end of the pivoted arm.

The pivotal mounting of the above device may comprise a pin engaging in bearing recesses in opposite sides of the bracket, the upper ends of the recesses being open so that the arm can be removed from the bracket by sliding the pin out of the recesses, leaving the bracket in position on the wall or like surface to which it is secured.

A releasable coupling made in accordance with the invention and a supporting device for a shelf are illustrated by way of example in the accompanying drawings in which:

Figure 5 is a side view of a pivotally mounted supporting arm which can be used either alone or in combination with the couplings shown in Figures 1–4 for supporting a shelf or the like;

Figure 7:
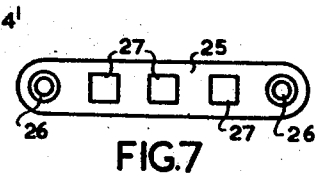
Figures 7 and 8 are respectively plan and side views of a plate adapted to co-operate with the free end of the supporting arm shown in Figure 5.
Figure 8:
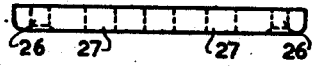
Figure 9:
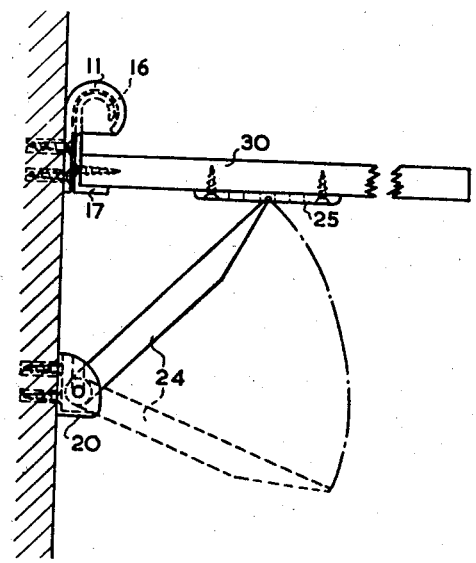
Figure 9 illustrates a shelf supported by the combination of parts shown in Figures 1–8.

The parts shown in Figures 1–8 are designed to co-operate to support the shelf shown in Figure 9. The parts comprise two releasable couplings, one adjacent each end of the shelf (only one being shown in Fig. 9), and a supporting arm disposed below and intermediate of the two couplings. Each releasable coupling comprises the two members shown separately in Figures 1 and 3 or the two members shown separately in Figures 2 and 4, the two members shown in Figures 2 and 4 being similar respectively to the corresponding members shown in Figures 1 and 3 but with some slight modification, as will be described hereafter.

Figure 1:
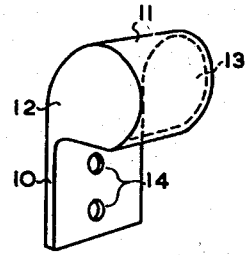
Figures 1 and 2 illustrate respectively the outer or supporting members of two complementary couplings.
Figure 2:
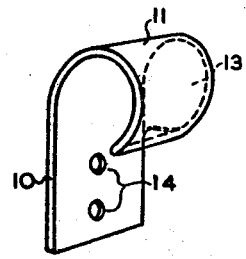
Figure 3:
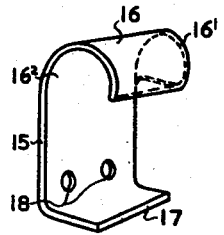
Figures 3 and 4 illustrate respectively the inner members of the complementary couplings, for engagement respectively with the members shown in Figures 1 and 2.
Figure 4:
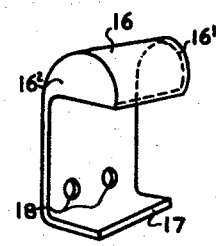

Referring first to Figures 1 and 3, the coupling member shown in Figure 1 comprises a metal plate 10 curved over at top on to one side to form a hook 11 approximately of cylindrical shape in cross-section, closed at the left end 12 and open at the right end 13. The hook 11 is formed so as to leave a space between its free edge and the adjacent side of the plate 10. The latter is provided below the hook 11 with two holes 14 to receive screws for screwing it to a wall or like surface. The complementary part 15 of the coupling shown in Figure 3 also comprises a metal plate 15 formed at top and on one side with a hook 16 the free edge of which is not turned in to the same extent as the extension 11, i. e. in cross-section it approximates more to a semicylinder, the space between the free edge of the hook 16 and the adjacent side of the plate 15 thus being wider than the space of the hook 11. The lower edge of the plate 15 is turned out horizontally to form a ledge 17, and two holes 18 are drilled in the plate above the ledge 17 to receive screws by means of which the plate can be screwed on to the end of a shelf or the like. The hood 16 is closed at the right end 16¹ and is open at the left end 16². The external diameter of the hook 16 is very little less than the internal diameter of the hook 11 so that it can be fitted in the hood 11 by engaging the free edge of the hook 16 against the inner surface of the edge of the hook 11 and subsequently turning the hook 16 into the hook 11 into the position shown in Figure 9. The parts shown in Figures 2 and 4 (in which like references are used to denote like parts) are respectively similar to the corresponding parts shown in Figures 1 and 3, the only difference being that the closed ends of the hooks 11, 16 are reversed, i. e. in Figure 2 the right end 13 of the hook 11 is closed and the left end 12 is open, whilst in Figure 4 the left end 16² of the hook 16 is closed and the right end 16¹ is open.

The closed ends of the two coupling parts 11, 16 increase the strength of these parts and both ends of each part may be closed if desired to increase still further the strength of these parts.

Assuming the parts shown in Figures 1 to 4 are to be used to support a shelf, the parts shown in Figures 1 and 2 are screwed on to a wall or like supporting surface at a suitable distance apart, corresponding to the length of the shelf, the part shown in Figure 1 being on the left and the part shown in Figure 2 being on the right. The left and right ends of the shelf or the like are screwed respectively on to the parts shown in Figures 3 and 4, these ends resting respectively on the ledges 17. On now tilting upwards the shelf or the like the free edges of the hooks 16 on the parts shown in Figures 3 and 4 can be engaged respectively in the spaces of the corresponding hooks 11 on the parts shown in Figures 1 and 2; the shelf is now turned downwards into a horizontal position as shown in Figure 9, the hook 16 turning in the hood 11 and finally fitting snugly against the inner surface thereof. Since the space at the bottom of the hook 11 is narrower than the space at the bottom of the hook 16 the latter cannot drop out but is supported by the hook 11. Outward lateral movement of the shelf in either direction is prevented by the closed ends 12, 13. In order at any time to remove the shelf it is only necessary to tilt it upwards in order to turn the hook 16 in the hook 11 in the opposite direction and subsequently withdraw it through the bottom space of the latter. The mechanical strength of the outer and inner parts of the couplings may be designed to support any likely loading of the shelf, and, if desired, more than two releasable couplings made according to Figures 1 and 3 or Figures 2 and 4, or in some cases only one such coupling will be necessary for adequate support.

The parts shown in Figures 1–4 are made by pressure die casting but they can be produced by any other suitable method, for example by extrusion. In the latter case instead of the two parts of the coupling being closed or faced at opposite ends, the inner ends of the inner parts of the coupling may be formed with stops adapted to butt against the inner ends of the outer coupling parts. These stops may be formed by raising a tongue of material from the ends of the parts.

If there is any danger that the shelf will sag due to overloading one or more stays may be provided to provide additional support from below. A suitable underneath support made in accordance with the invention, which may also be used independently of the couplings shown in Figures 1–4, is illustrated in Figures 5 and 6.

Figure 5:
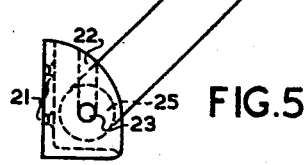
Figure 6:
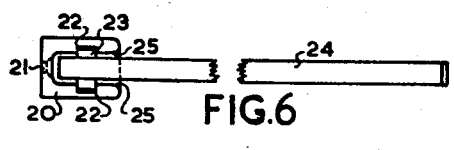
Figure 6 is a plan view of Figure 5.

The support shown in Figures 5 and 6 of the drawings comprises a bracket 20 formed in its rear wall with two holes 21 to receive screws by means of which it can be screwed to a wall or like supporting surface. An open-ended vertical recess 22 is formed in each of the opposite inner side walls of the bracket to receive the ends of a pin 23 projecting from opposite sides of an arm or stay 24, the arrangement being such that the arm can be swung in the bracket from a lower position determined by the front edge of the base of the bracket into a substantially vertical position. The arm 24 is formed with integral side bosses 25 surrounding the projecting ends of the pin 23, the bosses making contact with the inner sides of the bracket, thus preventing lateral play of the arm 24 in the bracket. The free end 24' of the arm is tapered to provide an end which can engage in an indentation in a catch plate fixed to the underneath surface of the shelf or like to be supported. A suitable form of catch plate is shown in Figures 7 and 8 and consists of a metal plate 25 provided with two screw holes 26, 26 by means of which it can be screwed to the surface to be supported and a plurality of indentations or apertures 27 which can be selectively engaged by the free end of the arm.

The parts shown in Figures 5–8 are made by pressure die casting, for example from the aluminium alloy "Mazac" above referred to.

Figure 10:
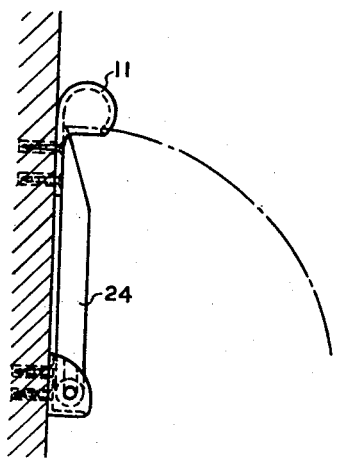
Figure 10 illustrates the supporting parts of Figure 9 when the shelf or like supported member is removed.

Figure 9 illustrates the devices shown in Figures 1–8 for supporting a shelf 30 or like surface. When this shelf or like surface is not required it can readily be removed by lifting it to disengage the pivoted arm or stay and to disengage the inner parts of the couplings in the manner above described. After the shelf has been removed the arm or stay 24 can be swung up into the out-of-use position shown in Figure 10 or it can be removed from the bracket. When the shelf and arm or stay are removed the only parts remaining on the supporting wall or like surface are the parts screwed thereto, namely the outer coupling part or parts and the bracket.

Although the embodiment shown in the drawings illustrates the use of a releasable coupling made according to the invention for supporting a shelf it is to be understood that the invention is in no way limited to this particular application, since the coupling may be used, with or without the underneath support 20, 24 for any suitable purpose. Suitably, in accordance with the invention the underneath support 20, 24 can be used independently of the coupling or couplings.

What I claim and desire to secure by Letters Patent is:

1. A releasable coupling for supporting a shelf-like member at a horizontal angle from a vertical wall, comprising a first plate which has a flat base portion adapted to be attached to said vertical wall and a hook portion projecting away from the plane of said base portion and having a curved inner surface, the free edge of said projecting hook portion being spaced from said base portion by a gap narrower than the maximum inner dimension of said hook portion taken in a direction normal to the plane of said base portion, and a second plate comprising a flat base portion adapted to be attached to a shelf projecting perpendicularly therefrom and a hook portion projecting away from the plane of its base portion, said last mentioned hook portion having a curved outer surface dimensioned to pivot on the curved inner surface of said first-mentioned hook portion, the maximum dimension of the hook portion of said second plate in a direction normal to the plane of its base portion being greater than the width of said gap, while its maximum dimension in a direction parallel to the plane of its base portion is less than the width of said gap, so that when the base portions of the two plates are normal to each other, the hook portion of said second plate may be inserted into the hook portion of said first plate through said gap and turned therethrough to a position within the hook portion of said first plate in which said plates are parallel to each other and in which the hook portion of said second plate may not be withdrawn through said gap, the inner surface of said first plate and the outer surface of said second plate being geometrically similar, so that when said hook portions are engaged with their base portions parallel, the base portion of said first plate serves as a stop preventing said second plate from turning more than 90 degrees from the position in which said base portions are normal to each other.

2. A releasable coupling as claimed in claim 1 in which both of said curved surfaces are part-cylindrical with the radius of the part-cylindrical surface on said second plate being only slightly less than that of said part-cylindrical surface on said first plate so that it fits snugly and may be pivoted therewithin.

3. A releasable coupling as claimed in claim 1 in which at least one of the curved edges of each hook portion is joined to a reinforcing web which occupies a plane transverse to that of the corresponding base portion.

References Cited in the file of this patent

UNITED STATES PATENTS

| | | |
|---|---|---|
| 350,031 | Bacon | Sept. 28, 1886 |
| 498,178 | Leonard | May 23, 1893 |
| 693,546 | Johnson | Feb. 18, 1902 |
| 834,411 | Rotsheck | Oct. 30, 1906 |
| 1,090,687 | Coon | Mar. 27, 1914 |
| 1,162,236 | Hipiloto | Nov. 30, 1915 |
| 1,538,877 | Baty | May 19, 1925 |
| 1,607,887 | Fowler | Nov. 23, 1926 |
| 1,632,116 | Buss | June 14, 1927 |
| 1,648,086 | Watson | Nov. 8, 1927 |
| 1,893,592 | Newman | Jan. 10, 1933 |
| 1,973,829 | Tobold | Sept. 18, 1934 |
| 2,658,233 | Kimmel | Nov. 10, 1953 |